(12) United States Patent
Crabtree et al.

(10) Patent No.: US 9,961,395 B2
(45) Date of Patent: May 1, 2018

(54) VIDEO CACHING

(71) Applicant: BRITISH TELECOMMUNICATIONS public limited company, London (GB)

(72) Inventors: Ian B Crabtree, London (GB); Timothy S Stevens, London (GB); Brahim Allan, London (GB); Rory S Turnbull, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days. days.

(21) Appl. No.: 14/909,279

(22) PCT Filed: Jul. 31, 2014

(86) PCT No.: PCT/GB2014/000299
§ 371 (c)(1),
(2) Date: Feb. 1, 2016

(87) PCT Pub. No.: WO2015/015140
PCT Pub. Date: Feb. 5, 2015

(65) Prior Publication Data
US 2016/0182941 A1 Jun. 23, 2016

(30) Foreign Application Priority Data
Aug. 2, 2013 (GB) .................. 13250084.4

(51) Int. Cl.
*H04N 5/76* (2006.01)
*H04N 21/433* (2011.01)
(Continued)

(52) U.S. Cl.
CPC ......... *H04N 21/4331* (2013.01); *G11B 27/10* (2013.01); *H04L 65/4084* (2013.01);
(Continued)

(58) Field of Classification Search
CPC combination set(s) only.
See application file for complete search history.

(56) References Cited

U.S. PATENT DOCUMENTS

2011/0080940 A1    4/2011  Bocharov et al.
2012/0195362 A1*   8/2012  Benno .................. H04N 21/222
                                                        375/240.01

(Continued)

FOREIGN PATENT DOCUMENTS

WO   WO 2005/109224   11/2005
WO   WO 2011/149672   12/2011
WO   WO 2013/058684    4/2013

OTHER PUBLICATIONS

International Search Report for PCT/GB2014/000299 dated Oct. 6, 2014, 4 pages.

*Primary Examiner* — Kieu Oanh T Bui
(74) *Attorney, Agent, or Firm* — Nixon & Vanderhye P.C.

(57) ABSTRACT

The invention presents a method of providing a modified manifest to a video client for streaming a video sequence associated with the manifest. An original manifest is modified to replace references to locations of lower quality, or bit rate, segments with references to equivalent segments at a higher quality, or bit rate, if the higher quality segment is cached locally. Then, when the video client determines that a given quality of segment should be streamed, it uses the modified manifest to retrieve the appropriate reference for that segment, and if a replacement has taken place, will be provided with the reference to the replacement segment at the higher quality. Thus, the client will always be provided with the highest possible quality segment taking into account local caching.

16 Claims, 4 Drawing Sheets (51) Int. Cl.
*H04N 21/231* (2011.01)
*H04N 21/2343* (2011.01)
*H04N 21/845* (2011.01)
*G11B 27/10* (2006.01)
*H04N 21/2662* (2011.01)
*H04N 21/6379* (2011.01)
*H04L 29/06* (2006.01)

(52) U.S. Cl.
CPC ..... *H04L 65/605* (2013.01); *H04N 21/23106* (2013.01); *H04N 21/23439* (2013.01); *H04N 21/2662* (2013.01); *H04N 21/6379* (2013.01); *H04N 21/8456* (2013.01)

(56) References Cited

U.S. PATENT DOCUMENTS

2012/0259994 A1    10/2012  Gillies et al.
2015/0215359 A1*   7/2015   Bao ....................... H04L 65/605
                                                       709/219

\* cited by examiner

| | rate_1 | rate_2 | rate_3 |
|---|---|---|---|
| segment_1 | S1-R1 | S1-R2 | S1-R3 |
| segment_2 | S2-R1 | S2-R2 | S2-R3 |
| segment_3 | S3-R1 | S3-R2 | S3-R3 |
| segment_4 | S4-R1 | S4-R2 | S4-R3 |
| ... | | | |
| segment_n | Sn-R1 | Sn-R2 | Sn-R3 |

| | rate_1 | rate_2 | rate_3 |
|---|---|---|---|
| segment_1 | S1-R1 | S1-R2 | S1-R3 |
| segment_2 | S2-R1 | S2-R2 | S2-R3 |
| segment_3 | *S3-R3* | *S3-R3* | S3-R3 |
| segment_4 | *S4-R2* | S4-R2 | S4-R3 |
| ... | | | |
| segment_n | Sn-R1 | Sn-R2 | Sn-R3 |

Figure 4b

VIDEO CACHING

This application is the U.S. national phase of International Application No. PCT/GB2014/000299 filed 31 Jul. 2014 which designated the U.S. and claims priority to EP Patent Application No. 13250084.4 filed 2 Aug. 2013, the entire contents of each of which are hereby incorporated by reference.

FIELD OF THE INVENTION

This invention relates to a method of managing a streaming request for video content, in particular where a manifest file associated with a video sequence is modified to take into account locally cached content.

BACKGROUND TO THE INVENTION

Adaptive video streaming technology is becoming more common, where video segments are encoded at a number of rates/resolutions and stored in the network at one or more servers. A client first downloads a manifest file, which describes the available rates/resolutions of each segment and where each is located (such as a content server). The client then uses the manifest together with an estimate of the bandwidth the client has available, to request appropriate segments that achieve playback of the video at an optimum quality without stalling. Perhaps the most widely adopted adaptive streaming standard at present is MPEG DASH (Dynamic Adaptive Streaming over HTTP). DASH provides a manifest in the form of a Media Presentation Description file or MPD file. Apples' adaptive video streaming technology, HLS (HTTP Live Streaming), provides a manifest in the form of a playlist file (.m3u file).

Caching is general technique than can be used to place content nearer to clients, and thus reduces the traversing clients have to make across the network to fetch content, thus reducing latency and increasing bandwidth.

Current content servers tend to cache content in CDNs (Content Delivery Networks). However, these are generally in the core of the networks and therefore the advantage of caching does not make a huge difference to video streaming. Caching saves costs in the networks for transit and reduces traffic over the core, but does not make a huge difference to the delivery to the client as the variability (especially in mobile) is likely to be towards the edge of the network.

Typically CDNs redirect content to a cache by the use of HTTP redirects. An HTTP request is first made to a central server (using the pre-fetched manifest for example), and the server then performs a lookup to find the closest cache to the client that holds the requested content. An HTTP redirect is then made to that location for the client to acquire the content.

Content can also be cached in web-browser caches on the local device. Whenever a request is made for some content, depending on the HTTP headers, that content may be cached on the local device. Alternatively, many systems use web proxies to cache content that can be served locally rather than re-connecting to the original server.

However, problems can arise with caching in an adaptive video streaming system. A client can request segment of video from a content server following a decision based on the manifest, without being aware that there might be a higher quality version in a cache that can be streamed as easily.

SUMMARY OF THE INVENTION

It is the aim of embodiments of the present invention to provide an improved method of adaptive streaming that takes into consideration cached content.

According to one aspect of the present invention, there is provided a method of managing a streaming request for a video sequence in a network, wherein said video sequence comprises a plurality of segments, and each of the plurality of segments is encoded at a plurality of quality settings to generate a plurality of encoded segments, wherein said method comprises:

i) receiving a manifest file associated with the video sequence, wherein the manifest file comprises, one for each segment of the video sequence at each quality setting, an identifier in the network where the respective encoded segment can be retrieved;
ii) identifying locally stored encoded segments;
iii) generating an updated manifest file by replacing, for a given segment of the video sequence, the identifier for that given segment at one of the quality settings with an identifier of the locally stored encoded segment, if the locally stored encoded segment is of higher quality setting;
iv) providing the updated manifest file to a video client for a video streaming request.

The manifest file may be received from a content server. The local store may be a cache.

Preferably, each segment comprises one or more temporal chunks. The quality setting may be a bit rate.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of providing a modified manifest to a video client for streaming a video sequence associated with the manifest. An original manifest is modified to replace references to locations of lower quality, or bitrate, segments with references to equivalent segments at a higher quality, or bit rate, if the higher quality segment is cached locally. Then, when the video client determines that a given quality of segment should be streamed, it uses the modified manifest to retrieve the appropriate reference for that segment, and if a replacement has taken place, will be provided with the reference to the replacement segment at the higher quality. Thus, the client will always be provided with the highest possible quality segment taking into account local caching."

Figure 1:
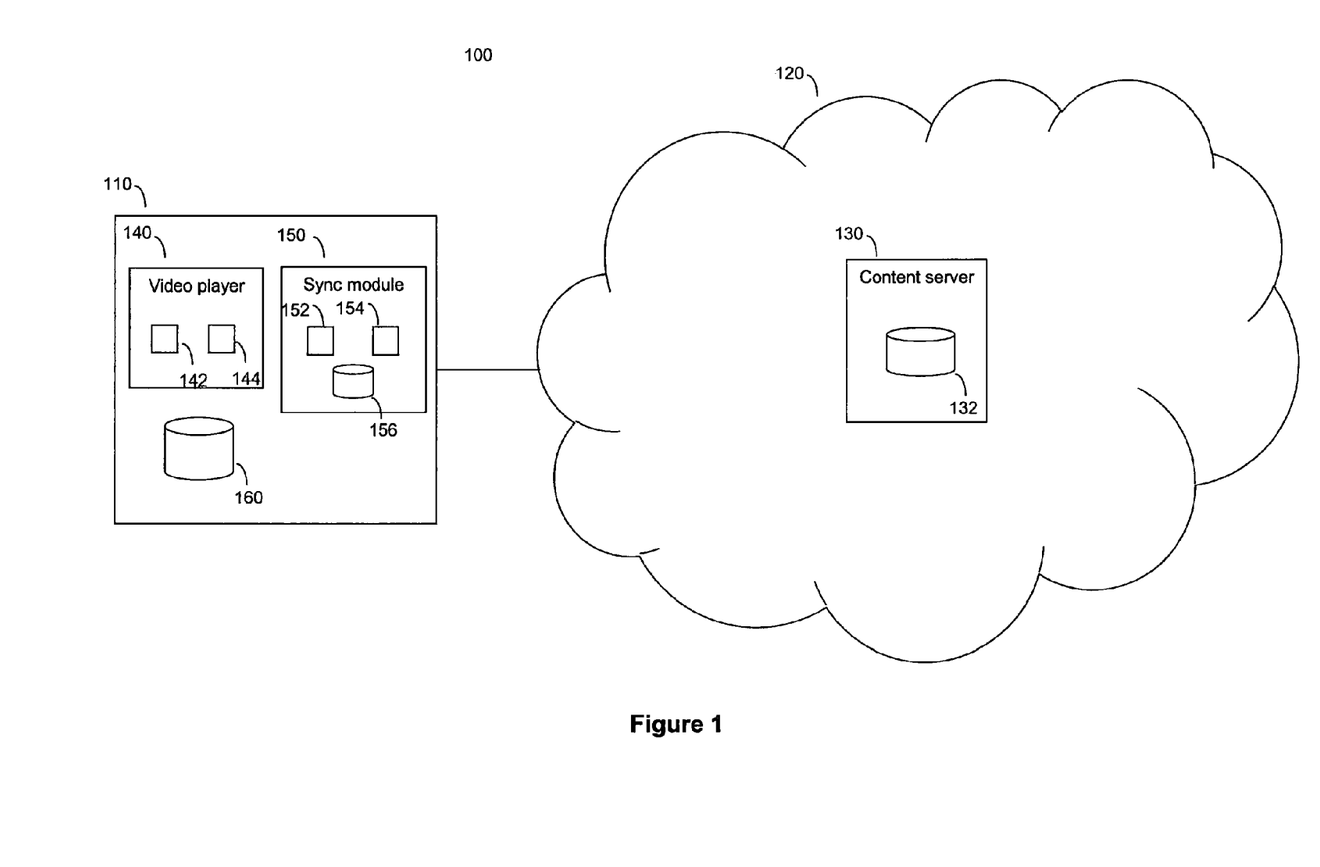
FIG. 1 is a system diagram of an example of the present invention.

FIG. 1 shows a system 100 comprising a client 110 connected to a network 120, where the network includes a content server 130. The client 110 is a PC, but it will be understood that the client could also be a suitably configured smart TV, mobile device, set-top box or similar, having the same elements, and configured to connect to the content server 130 over the network 120.

The client 110 comprises a video player 140, a synchronisation, or sync, module 150, and a cache 160. The video player 140 comprises a processor 142 operating under the control of program modules 144, which may be stored in suitable storage such as a hard disk or ROM. The video player 140 is able to receive and decode video content for outputting to a suitable display (not shown). The video content is stored locally or streamed over the network 120 from the content server 130.

The cache 160 stores video content for playback by the video player 140. As will be described later in more detail, the video content can include segments of encoded video content as well as complete video sequences. The cache 160 is considered to be a local store, in the sense that data stored there can be retrieved quicker than if stored remotely in the network 120. Storing data locally in such a manner is also referred to as caching. Video segments may be cached following the streaming of those segments, or may be cached pre-emptively by the client in advance of any requests by the video player 140. Caching segments in this manner, and then delivering the segments from the cache 160 to the video player 140 rather than from a remote server helps reduce latency and is more efficient in terms of network usage.

The video player 140 can also make requests for video content stored remotely. One source of remote video content is the content server 130. The content server 130 comprises a data store 132, where video content is stored. The content server 130 thus provides video content to the client 110 as well as any other devices making suitable requests. In this invention, an adaptive streaming approach is used, where a given piece of video content or video sequence is split into multiple contiguous temporal portions or segments, with each segment encoded at a number of bit rates or quality settings resulting in different bit rates. Encoding at a constant perceptual quality is described in the Applicant's International patent application WO2009/060178. A video compression approach such as ITU-T's H264 standard can be used to encode the segments, where each segment is typically 2 to 10 seconds long and preferably comprises a whole number of groups of pictures (GOPs) to enable smooth switching between segments at segment boundaries. The encoded segments are stored in the data store 132.

In this example, a video sequence A, is divided into n contiguous temporal segments: segment_1, segment_2, segment_3 . . . segment_n. Each segment is encoded according to the H264 standard at 3 different bit rates: rate_1, rate_2 and rate_3. Thus, the video sequence results in (n×3) encoded segments, each of which is stored in the local store 132.

The data store 132 also stores a manifest file associated with each video sequence, which describes the available bit rates of each encoded segment of the sequence and where they can be located (as segments can be cached at some intermediate node as well as at the content server itself). Under adaptive streaming, the video player 140 makes requests for segments coded at a bit rate it has calculated it can support, taking into account network bandwidth, and playout buffer levels for example. The video player 140 utilises the manifest file to decide specifically which of the encoded segments to request, and where to direct the requests.

The examples of the invention described herein below are based on the MPEG DASH adaptive video streaming standard. Under MPEG DASH, the manifest file that is used to decide which of the encoded segments to request takes the form of a Media Presentation Description MPD file. Note, the invention can also be implemented using other adaptive streaming standards, such as Apple's HLS (HTTP Live Streaming), where the manifest would instead take the form of .m3u8 playlist files (one file per bitrate, and a master playlist file linking the separate bitrate files).

Figure 4A:
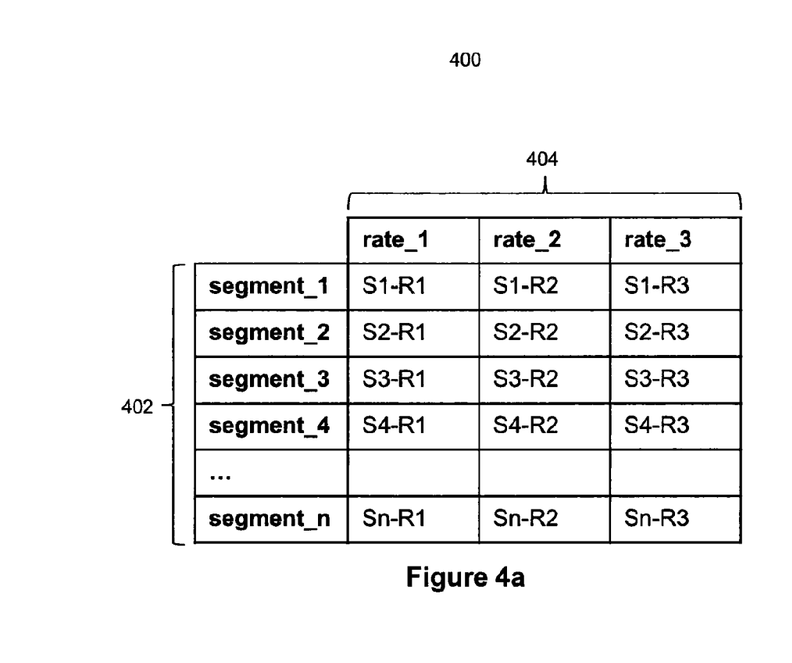
FIG. 4a is a table illustrating an example manifest file.

The MPD file is an XML file. It contains information about segments of encoded video, such as the segment identifier, encoding bitrate of the segment, and resource locator for the segment. FIG. 4a is a table showing in simplified form the data stored in a typical MPD file. In this example, the manifest file for video sequence A is an XML file called A.mpd, and stored in the data store 132.

The sync module 150 in the client 110 comprises a processor 152 operating under the control of program modules 154, which may be stored in suitable storage such as a hard disk or ROM. The sync module 150 also includes a data store 156. The data store 156 is used to store updated manifest files as well as update history for updates made to a manifest file. The operation of the sync module 150 will be described herein below.

Whilst the processors 142 and 152 are shown as being separate, a person skilled will appreciate that the functionality of the two processors could be provided instead by a single physical processor within the client device 110. Similarly, the cache 160 and data store 156 can be provided by separate storage means, such as hard disks, or by a single, common storage means, like a single disk array.

Figure 2:
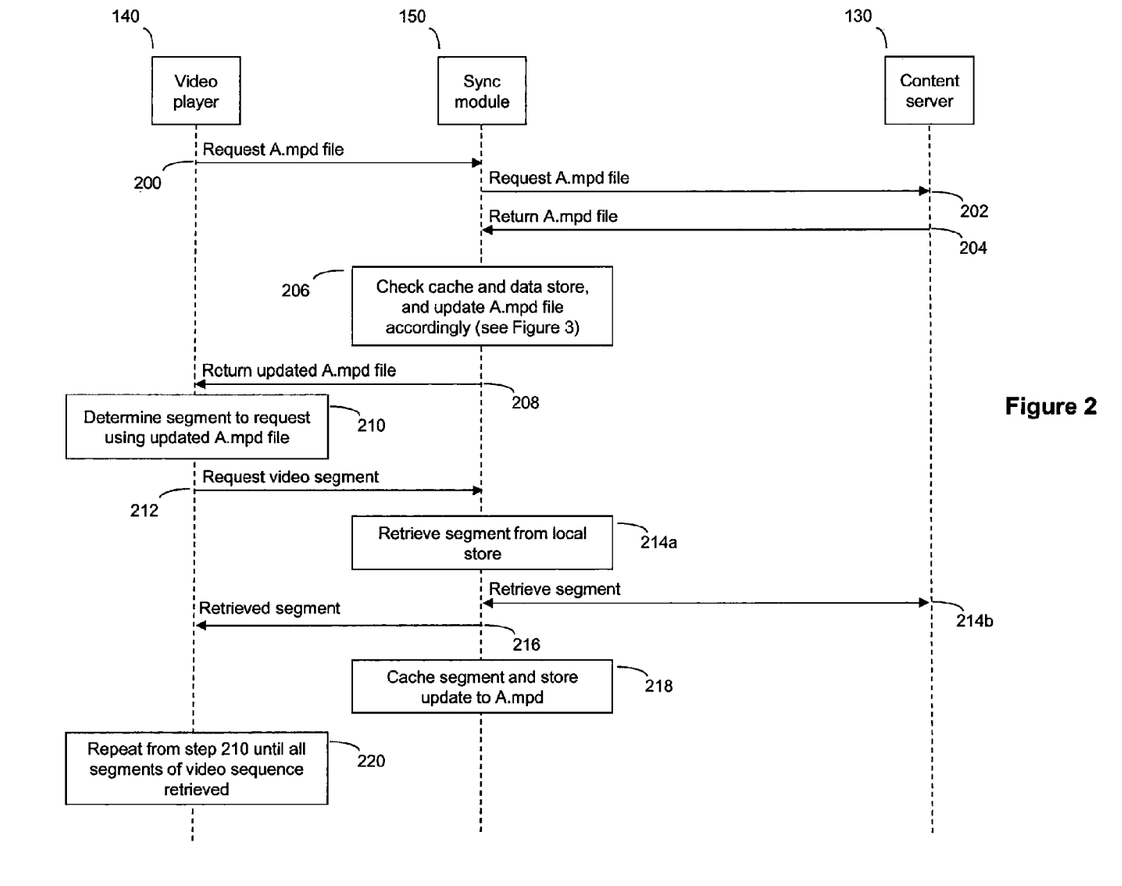
FIG. 2 is a process flow diagram for the overall method in an example of the present invention.

An example of the present invention will now be described with reference to the process flow diagram in FIG. 2, where references to elements from FIG. 1 will be made using like reference numerals.

In this example, the video player 140 attempts to stream video sequence A from the content server 130. The video player 140 first makes a request in step 200 for the manifest file, A.mpd, associated with video sequence A from content server 130. The video player knows to direct the request to the content server 130 based on an earlier retrieved playlist or similar identifying the available content from the content server 130. The request is processed by the sync module 150, which checks to see if there is a locally stored version of the A.mpd file in the data store 156. The sync module 150 functions like a proxy here, allowing it to process requests from and responses to the video player 140. In this initial example, it is assumed that there is no locally stored version of the A.mpd file at this stage. The sync module 150 thus forwards the request onto the content server 130 in step 202. The content server 130 receives the request for A.mpd, and retrieves A.mpd from the data store 132, and sends the file A.mpd back to the client 110 in step 204.

FIG. 4a is a table 400 summarising the key information in the manifest file A.mpd relevant to this invention. It should be noted that the actual information is in XML format and not a table as such, but this table representation sets out the key information in a manner that is easier to understand. Each row 402 of the table 400 corresponds to a specific segment: segment 1, segment 2, segment 3, segment 4, and so on, through to segment n. Each column 404 corresponds to the encoding bit rate (rate_1, rate_2 and rate_3), where each rate can be fixed across all segments i.e. rate_1(segment_1)=rate_1(segment_2)=rate_1(segment_3) and so on, or can be different for some segments i.e. rate_1(segment_1) ≠rate_1(segment_2). The rates are shown here in ascending order, where rate_1<rate_2<rate_3. The table shows for each segment/rate pair, an addressable name or identifier identifying the location where the corresponding segment encoded at that rate can found. The identifier is a universal resource identifier, or URI. For example, the URI for the location where segment_1 coded at rate_1 can be found is S1-R1. Initially, the URIs in table 400 will point to their respective segments on the content server 130. However, these URIs can be changed according to the invention as described below.

In step 206, the sync module 150 receives the A.mpd file from the content server and processes it after checking the cache 160 and data store 156. In particular, a check is done to determine whether there are any locally cached segments of the video sequence A in the cache 160. A further check is made on the update history of the manifest, which is important when the manifest file being processed is a locally stored version that has been updated previously. This processing is done by the sync module 150 and summarised in the flow chart of FIG. 3.

Figure 3:
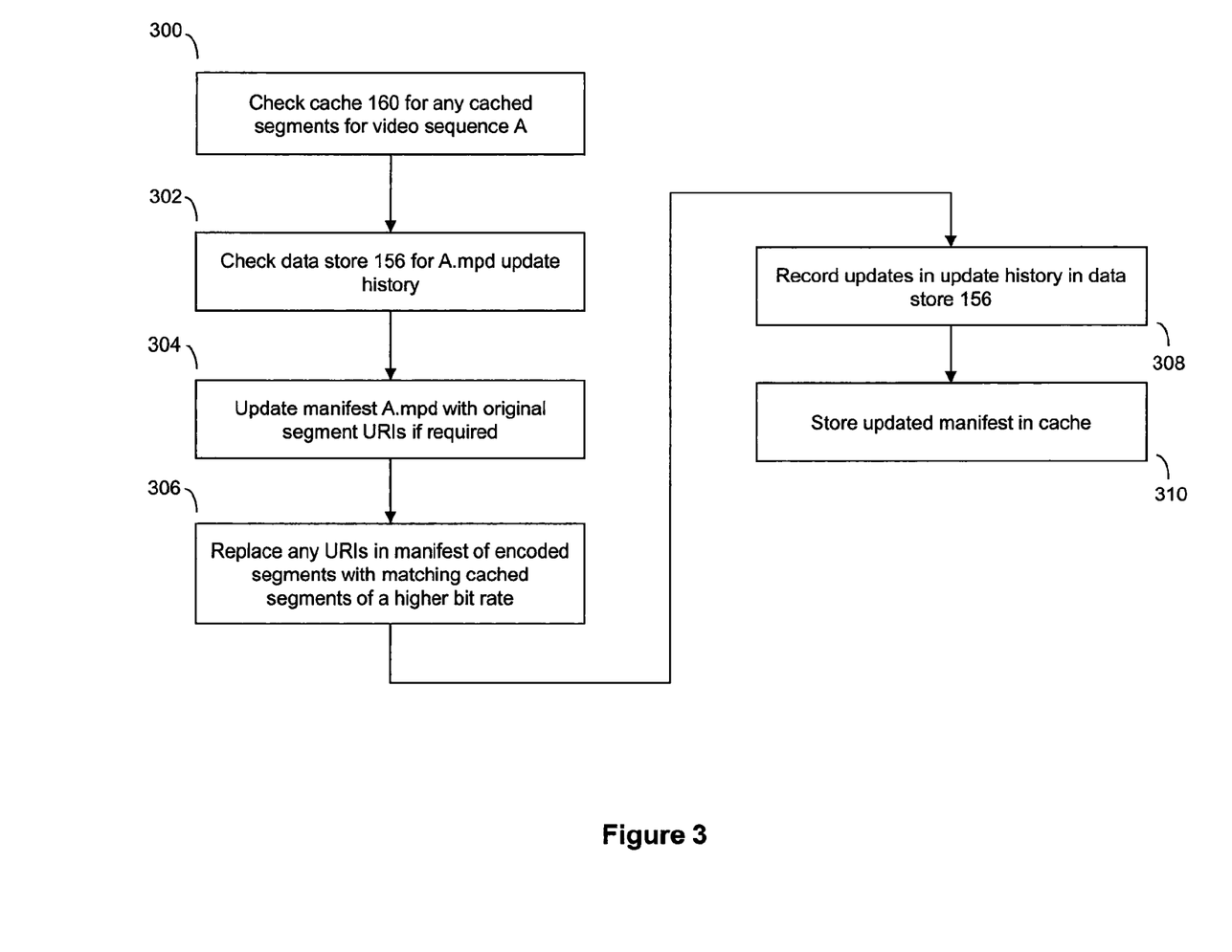
FIG. 3 is a flow chart showing the steps of operation of the sync module in an example of the present invention.

In FIG. 3, step 300, the sync module 150 checks the cache 160 to determine if there are any locally cached segments of video associated with the video sequence A. In this example, let us assume that video sequence A has been streamed previously or there has been some pre-emptive caching of some segments, resulting in segment_3 encoded at rate_3, and segment_4 encoded at rate_2, both being stored in the cache 160.

Steps 302 and 304 are invoked if the manifest file is one that was retrieved from the data store 156, which can happen if the video sequence has been streamed before or if there was some pre-emptive downloading that included a request for the manifest file, and a version of the resulting manifest file A.mpd has been stored locally. For this example, we have assumed that there is no locally stored version of A.mpd, and steps 302 and 304 are bypassed.

In step 306, the sync module 150 analyses the A.mpd file and cached segments found from step 300. It compares the cached segments with those identified in the manifest A.mpd. If it finds a cached segment encoded at a higher bit rate than the lowest bit rate available according to the manifest for a given segment, then the sync module replaces any lower bit rate references in the manifest for that segment with a reference to the cached higher bit rate segment.

So, in this example, identified in step 300 were two locally cached segments: segment_3 encoded at rate_3, and segment_4 encoded at rate_2. Thus, as cached segment_3 encoded at rate_3 is coded at a higher bit rate than the lowest bit rate, rate_1, for segment_3, the sync module replaces the URI in A.mpd for segment_3 coded at rate_1, S3-R1, with the URI for cached segment_3 encoded at rate_3, S3-R3. Also, as cached segment_3 encoded at rate_3 is coded at a higher bit rate than rate_2 for segment_3, the sync module replaces the URI in A.mpd for segment_3 coded at rate_2, S3-R2, with the URI for cached segment_3 encoded at rate_3, S3-R3. And finally, as cached segment_4 encoded at rate_3 is coded at a higher bit rate than rate_2 for segment_3, the sync module replaces the URI in A.mpd for segment_3 coded at rate_2, S3-R1, with the URI for cached segment_3 encoded at rate_3, S3-R3.

Figure 4B:
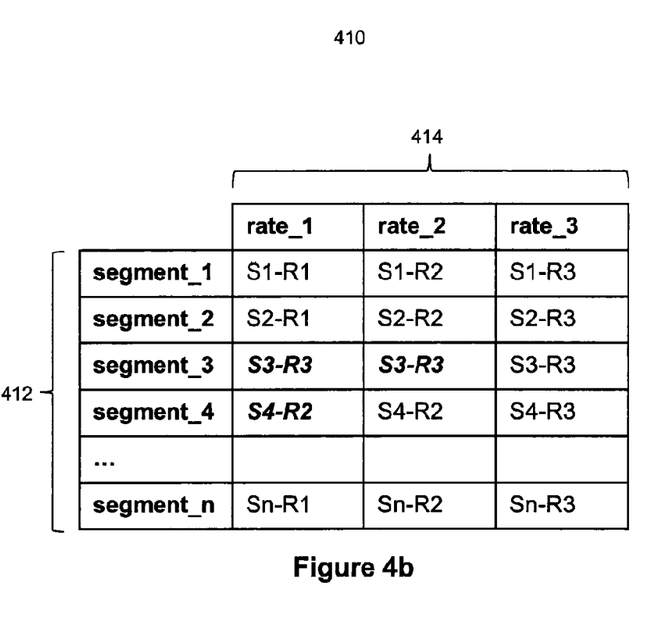
FIG. 4b is a table illustrating an example updated manifest file in an example of the present invention.

Table 410 in FIG. 4b shows the resulting modified A.mpd file after the updates have taken place.

It should be noted that the replacement URIs need only be the URIs for the relevant segment at the content server 130, and not the locally stored version of the segment in the cache 160. This is because the sync module 150 is designed to include a proxy function that allows it to process requests and fulfil using any equivalent locally cached content or segments. Should the sync module 150 not include such proxy like functionality, then the URIs are set to the actual location of the cached segments in the local cache 160, and not to the location in the content server 130.

In step 308, a log file is written to record the update history of the A.mpd file. This log file comprises a look-up table identifying the segments/rates updated, noting the old (replaced) URI and the new (replacement) URI. The purpose of this log file is so that the updated A.mpd file can be verified in later use against any actual segments cached, as the cached segments may be modified or deleted depending on how the cache 160 is managed. A discussion of how this is used will be described later.

In step 310, the updated manifest A.mpd is stored in the data store 156.

Now, turning back to FIG. 2. In step 208, the updated A.mpd file (see table 410) is returned to the video player 140.

The video player 140 uses the updated manifest A.mpd to determine which segment to request first. Typically, the video player 140 will start with segment_1, the start of the video sequence. However, the video player has a choice of three rates at which segment_1 is encoded. The video player may simply select the lowest rate initially, rate_1. Alternatively, the video player may use a suitable adaptive streaming algorithm to determine which rate to request, for example by estimating some approximate minimum bit rate the network is capable of supporting, and select one of three rates accordingly. Here, let's assume that video player 140 makes a request for segment_1, rate_1 in step 212, using the URI S1-R1. S1-R1 identifies the segment at a location at the content server 150.

However, if the requested segment is one that is cached locally, then the sync module 150 retrieves the segment from the local cache in step 214a. In this specific example, there are only locally cached segments for segment_3 and segment_4. Thus, processing passes instead to step 214b, where the request for the segment is directed directly to the content server as specified by the URI S1-R1, and the content server sends the requested segment back to the client.

In step 216, the sync module 150 forwards the retrieved segment to the video player 140, but may also cache a copy of the retrieved segment in the local cache 160 at the same time in step 218. If a copy is cached, and its bit rate is higher than the lowest bit rate for that segment according to the manifest stored locally (from step 310), then the manifest is updated and the log file updated according to the method of step 306 and 308 respectively.

In step 220, the video player repeats the process from step 210 to request subsequent segments.

When video player 140 gets to segment_3, the video player may decide that it can only support streaming of the segment at rate_2 as a result of its adaptive streaming algorithm, perhaps as result of the delivery times of earlier segments indicating that only rate_2 can be successfully retrieved over the network 120. It therefore proceeds to request segment_3 encoded at rate_2, but by using the updated manifest file, the URI provided for segment_3/rate_2 is S3-R3. Thus the request made in step 212 is for segment_3 encoded at rate_3, which the sync module 150 processes and retrieves from the local cache 160 as per step 214a. Similarly, when it makes a request for segment_4, any request for segment_4/rate_1 will result in the URI of S4-R2 being used, and hence the cached segment for segment_4 encoded at rate_2 will be retrieved from the cache instead by the sync module 150.

Thus, by updating the manifest as described to reflect locally cached segments, provision of encoded segments is optimised to return the highest bit rate segment available taking into consideration of what is cached.

In another example of the invention, the sync module has stored an updated manifest file in the data store 156 prior to the video player making a request for video sequence A. This is most likely to occur in a pre-emptive downloading scenario where the manifest file is pre-fetched and updated, as a result of pre-caching of some of the video segments in the cache 160.

Referring to FIG. 3, now when the video player makes a request for the A.mpd file in step 200, the sync module 150 retrieves the updated A.mpd file stored in data store 156, which looks like the table 410 in FIG. 4b, and processing passes to step 206. Note, there will also be a log file stored in the data store 156 noting the update history to the A.mpd file. Now in step 300, the sync module checks the cache 160 for any cached segments matching those of video sequence A in step 302. According to the updated manifest A.mpd, there should be at least segment_3 encoded at rate_3, and segment_4 encoded at rate_2, stored in the cache 160. However, these may have been deleted as a result of other segments being cached instead since the locally cached A.mpd was last updated. If segment_3 encoded at rate_3 and segment_4 encoded at rate_2 are no longer in the cache, then the sync module can use the log file to reverse the changes to the updated manifest A.mpd in step 304, so that the original URIs can be restore, thus avoiding the manifest incorrectly referring to segments that are no longer stored in the cache 160. After that, processing continues as before at step 306 through to 310, and then back to step 208 in FIG. 2.

These additional steps ensure that the updated manifest file properly reflects the current state of the local cache 160.

The above example largely describes the video player 140 triggering the initial request for a manifest file. In another example of the invention, the sync module 150 obtains a playlist of video sequences that the video player 140 can play, and pre-emptively requests the manifest file for some of those sequences together and pre-emptively downloads some segments of those sequences from the content server, for caching in the data store 160. The pre-emptively requested manifest files are stored in the data store 156, and when the video player requests a manifest file in step 200, steps 202 and 204 are omitted, and instead the sync module retrieves the pre-emptively requested manifest file from the data store 156, and proceeds to step 206.

The function of the sync module described above includes retrieval of any locally cached segments, in essence performing a proxy function. However, the retrieval of locally cached segments can instead be handled by a separate proxy cache function as part of the cache 160, leaving the sync module to manage functions in relation to the manifest only.

Whilst the above specific examples describe the replacing of URIs based on relative bit rates, relative quality or perceptual quality can be used instead. It is just that in most cases, quality correlates well with bit rate, so as bit rate increases, quality tends to increase as well. Furthermore, the encoding of a segment at a given quality will result in an encoded segment at an associated bit rate, which is why the above example is described with reference to bit rates rather than quality. However, there are situations where the bit rate might not increase with quality, especially when the quality measure is a perceptual quality. For example, a segment encoded with a lower resolution and lower bit rate, but could have a higher perceptual quality compared to the same segment encoded at a higher resolution and higher bit rate.

Whilst the video coding described above utilises H264, a person skilled will appreciate that other video compression techniques could be used instead.

The sync module 150 and cache 160 can also be provided separately from the client 110. For example, they may be located in a home hub, router, or media server connected to the client. The main condition on successful operation is that the sync module and cache should be connected to the client over a connection having very low transmission delays, otherwise the effectiveness of the caching will be significantly reduced.

Exemplary embodiments of the invention are realised, at least in part, by executable computer program code which may be embodied in an application program data. When such computer program code is loaded into the memory of the processor 152 in the sync module 150, it provides a computer program code structure which is capable of performing at least part of the methods in accordance with the above described examples of the invention.

A person skilled in the art will appreciate that the computer program structure referred to can correspond to the flow chart shown in FIG. 3, where each step of the flow chart can correspond to at least one line of computer program code and that such, in combination with the processor 152 in the sync module, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing a streaming request for a video sequence in a network, wherein said video sequence comprises a plurality of segments, and each of the plurality of segments is encoded at a plurality of quality settings to generate a plurality of encoded segments, wherein said method comprises:
   i) receiving a manifest file associated with the video sequence, wherein the manifest file comprises, one for each segment of the video sequence at each quality setting, an identifier in the network where the respective encoded segment can be retrieved;
   ii) identifying locally stored encoded segments;
   iii) generating an updated manifest file by replacing, for a given segment of the video sequence, the identifier for that given segment at one of the quality settings with an identifier of the locally stored encoded segment, if the locally stored encoded segment is of higher quality setting;
   iv) providing the updated manifest file to a video client for a video streaming request.

2. A method according to claim 1, wherein the received manifest file is from a content server.

3. A method according to claim 1, wherein the local store is a cache.

4. A method according to claim 1, wherein each segment comprises one or more temporal chunks.

5. A method according to claim 1, wherein the quality setting is a bit rate.

6. The method according to claim 1, further comprising:
determining that the given segment should be streamed, and
using the updated manifest to retrieve the replacement identifier for that given segment.

7. The method according to claim 1, further comprising: locally storing the updated manifest.

8. The method according to claim 1, further comprising: generating a log file identifying the segments that have been updated, replaced identifiers, and replacement identifiers.

9. The method according to claim 8, further comprising: locally storing the generated log file.

10. A method according to claim 1, wherein the quality setting is a perceptual quality.

11. A client device comprising:
a local storage;
a processing system, including at least one computer processor, the processing system at least being configured to:
  i) use a manifest file associated with a video sequence comprising a plurality of segments, each of the plurality of segments being encoded at a plurality of quality settings to generate a plurality of encoded segments, wherein the manifest file comprises, for each segment of the video sequence at each quality setting, an identifier where the respective encoded segment can be retrieved;
  ii) store the encoded segments in the local storage;
  iii) compare a given encoded segment that is stored in the local storage with a corresponding segment identified in the manifest file;
  iv) generate an updated manifest file by replacing, for the given segment of the video sequence, the identifier for that given segment at one of the quality settings with an identifier of the encoded segment stored in the local storage, if the encoded segment stored in the local storage is determined to have a higher quality setting based on the comparison;
  v) process a request that the given segment should be streamed; and
  vi) use the updated manifest to retrieve the replacement identifier for that given segment.

12. The client device according to claim 11, wherein the quality setting is a bit rate.

13. The client device according to claim 11, wherein the processing system is further configured to store the updated manifest in the local storage.

14. The client device according to claim 11, wherein the processing system is further configured to generate a log file identifying the segments that have been updated, replaced identifiers, and replacement identifiers.

15. The client device according to claim 14, wherein the processing system is further configured to store the generated log file in the local storage.

16. The client device according to claim 11, wherein the quality setting is a perceptual quality.

* * * * *